United States Patent
Transfeld et al.

(10) Patent No.: US 6,656,364 B1
(45) Date of Patent: Dec. 2, 2003

(54) METHOD FOR PURIFYING CONTAMINATED LIQUIDS

(75) Inventors: Peter Transfeld, Magdeburg (DE); Gunter Borner, Langenweddingen (DE); Matthias Schneider, Magdeburg (DE); Rainer Wetzel, Uenglingen (DE)

(73) Assignee: OHMI Forschung und Ingenieurtechnik GmbH, Magdeburg (DE)

( * ) Notice: Subject to any disclaimer, the term of this patent is extended or adjusted under 35 U.S.C. 154(b) by 0 days.

(21) Appl. No.: 09/381,560

(22) PCT Filed: Mar. 18, 1998

(86) PCT No.: PCT/EP98/01567

§ 371 (c)(1),
(2), (4) Date: Dec. 10, 1999

(87) PCT Pub. No.: WO98/41596

PCT Pub. Date: Sep. 24, 1998

(30) Foreign Application Priority Data

Mar. 18, 1997 (DE) .......................................... 197 11 174

(51) Int. Cl.⁷ .............................................. B01D 15/00
(52) U.S. Cl. ...................... 210/665; 204/572; 210/748
(58) Field of Search .................... 204/572; 210/663, 210/748, 805, 806, 665

(56) References Cited

U.S. PATENT DOCUMENTS

| | | | |
|---|---|---|---|
| 2,618,644 A | 11/1952 | Bailey | 210/193 |
| 2,717,256 A | 9/1955 | McMichael et al. | 208/298 |
| 3,763,040 A | 10/1973 | Timpe et al. | 210/667 |
| 4,040,926 A | * 8/1977 | Oberton | 204/572 |
| 4,049,520 A | * 9/1977 | Wagner | 204/572 |
| 5,342,508 A | 8/1994 | Transfeld | 208/299 |
| 5,753,103 A | 5/1998 | Transfeld et al. | 208/303 |

FOREIGN PATENT DOCUMENTS

| | | |
|---|---|---|
| DE | 42 10 795 C1 | 5/1993 |
| DE | 43 44 828 A1 | 6/1995 |
| DE | 196 20 695 C1 | 5/1997 |
| EP | 0 524 534 A2 | 7/1992 |
| GB | 1 470 361 | 6/1975 |

* cited by examiner

*Primary Examiner*—Ivars Cintins
(74) *Attorney, Agent, or Firm*—Salter & Michaelson

(57) ABSTRACT

The invention relates to a method for cleaning liquids containing impurities. Adsorbents are added to the liquid, which adsorb the impurity. Several particles of adsorbent are agglomerated with the impurities adsorbed therein/thereon to form greater particles of adsorbent. The now greater particles of adsorbent are suspended in the liquid once again. The liquid containing the greater particles of adsorbent is then filtered.

An apparatus possesses at least one agglomerator with a feed inlet, an outlet each for the separated components (clear runnings, concentrated suspension) and an apparatus for producing the agglomeration. The latter is preferably an apparatus for producing an electric field. A pressure filter with a feed inlet for the concentrated suspension and an outlet each for the separated components is further provided.

42 Claims, 3 Drawing Sheets

METHOD FOR PURIFYING CONTAMINATED LIQUIDS

BACKGROUND OF THE INVENTION

1. Field of the Invention

The invention relates to a method for cleaning liquids containing impurities, in which an addition of adsorbents takes place, together with an apparatus for carrying out said method.

2. Related Art

It is known that in manufacturing processes impurities, for example dyestuffs, phosphatides and solids particles, have to be separated from liquid recyclates. For example, DE 31 23 462 A1 describes an apparatus for the electrostatic cleaning of dielectric liquids, in which the dielectric liquid is exposed to an electric field in a tank with an inflow opening for the contaminated dielectric and an outflow opening for the cleaned dielectric in the upper part of the tank, as well as an outlet opening for the impurities in the lower part above two systems of electrodes disposed therein. The separation of the very small particles which get into the dielectric liquid during electrochemical machining is barely possible with mechanical filters because of the low permeability of the filter cake formed. Electrostatic cleaning is particularly suitable for this.

In particular for the obtaining or processing of animal, vegetable or marine oils it is known; in general from DE 42 10 795 C1 that the liquids, in particular those for the production of foodstuffs, form a mixture together with solids particles. The solids particles and impurities can be inter alia undesirable phosphatides, soap residues and complex colloidal compounds, but also adsorbents added for performing a cleaning such as bleaching earths, activated carbon and silica. The adsorbents are mixed with the liquid for the cleaning. In so doing said adsorbents contact in a so-called bleaching stage inter alia dyestuffs such as carotene and chlorophyll, heavy metals, residues of phosphatides and soaps as well as peroxides. Due to the contact the substances from the oil or fat attach themselves to the adsorbents and can be removed from the liquid together with the latter.

The separation of the adsorbent loaded with the above-mentioned substances from the bleached oil takes place in the known process with the aid of pressure filters which operate according to the principle of precoat filtration. There are known for the filtering e.g. plate-and-frame presses, plate filters and tube filters, as well as crossflow filtration. It is a disadvantage with pressure filtration, however, that the filter cake formed inhibits strongly the flow of the liquid. In keeping with this, a considerable expenditure of energy is required for the pumping through of the liquid. Furthermore, the carrying capacity of the filters is rapidly exhausted, making frequent filter replacement or filter cleaning necessary.

Conversely, there is known from DE 43 44 828 A1 a method and an apparatus for cleaning liquids containing impurities in which the contaminated liquid is exposed to an electric field by means of mutually insulated electrodes, in which simultaneously the viscosity of the liquid to be cleaned is lowered by heating. With this method, although one part of the liquid can be withdrawn cleaned, a not inconsiderable part of the liquid nevertheless remains in the bleeding. It is furthermore disadvantageous that the layout and control of the electrodes are cumbersome.

SUMMARY

The invention is based on the problem of specifying a method and an apparatus for cleaning liquids containing impurities, such as oils and fats, in which method/apparatus the separation takes place with relatively little equipment and low energy requirements.

The problem is solved for the method given in the preamble by the steps:

addition of adsorbents, which adsorb the impurities, to the liquid, agglomeration of respectively several particles of adsorbent with the impurities adsorbed therein/thereon to form greater particles of adsorbent, renewed suspension of the now greater particles of adsorbent in the liquid and filtering of the liquid containing the suspended greater particles of adsorbent.

First of all, in the conventional manner, the relatively fine-grain particles of adsorbent adsorb the impurities that are present in the liquid as solids particles or dyestuff or other and are to be removed. When or while the particles of adsorbent have taken/been taking up the impurities, an agglomeration of the fine-grain particles of adsorbent is then carried out.

Preferably the suspension is first of all exposed to an electric field for a particular time, wherein the loaded particles are moved towards an electrode. There the particles agglomerate, are separated and are suspended in the liquid once again on disconnection of the electric field, wherein the particles of adsorbent exhibit as a result of the agglomeration an enlarged particle structure. In particular the particles have after the agglomeration a porous, loose structure.

The subsequent filtration, which is preferably carried out as a pressure filtration, can be executed more effectively by virtue of the enlarged particle structure, since the enlarged particles bestow a sufficient permeability for the liquid during the formation of the filter cake. Thus it is possible according to the invention to operate the filtration up to a considerably higher loading of the filter area.

If, as known from DE 43 44 828 A1, a fraction of the liquid which is substantially free of adsorbents and hence of solids particles is withdrawn simultaneously during the agglomeration of the solids, for example at an outlet disposed in the upper part of a tank, a part of the liquid to be separated has already been cleaned. There arises in the remaining liquid, on renewed suspension of the solids collected and attached first of all due to the electric field, a strongly concentrated suspension. Because of the porous structure of the agglomerated particles in the liquid to be cleaned during the subsequent pressure filtration the area of the precoat filters for example used can be reduced considerably.

The invention becomes particularly effective if it is used as a part step in a countercurrent bleaching process, such as is described in German patent application 196 20 695.2-41 published at a later date. In counter-current processes uncleaned oils are brought into contact with already partially loaded adsorbent in a stage and then in a second stage the oil partially cleaned in the first stage is brought into contact with fresh adsorbent. The adsorbent used in the second stage then serves as partially loaded adsorbent in the first stage. The end product of the second stage is then highly cleaned oil.

The concentrated suspension now obtained according to the invention, containing the already agglomerated and loaded particles of adsorbent, can now be treated in such a countercurrent process as the "partially loaded adsorbent" and be introduced in the first stage together with the still uncleaned oil. The agglomerated particles of adsorbent can thus be used again with a saving on materials.

The use of bleaching earth as adsorbing agents is preferred for the cleaning of animal, vegetable or marine oils and/or fats, in particular those for the production of foodstuffs. The use of silica gels or activated carbon, for example, is however also possible.

Because the bleaching earth to be fed has a large fine grain content, for example with a grain spectrum of 5 to 10 $\mu$m, the adsorptive power is increased due to the enlarged free surface of the fine-grain bleaching earth. It is no longer necessary, therefore; to use an excessive proportion of bleaching earth. The consumption of bleaching earth therefore falls with advantage. The amount of bleaching earth used can in the case of rape oil, for example, be reduced in absolute terms from the minimum 0.6% conventional to date to 0.3%. Furthermore, the fine grain bleaching earth is more favourable as regards procurement costs than the bleaching earth structured as a result of pretreatment which is used to date. For the grain size distribution has represented to date a compromise between a sufficiently good bleaching effect and a sufficiently good separability by conventional filter systems. However, since according to the invention fine-grain bleaching earth of high adsorptive power is used to start with and the latter is agglomerated to form more coarsely-grained particles, the suspension is optimally structured for the subsequent filtration.

A particularly economic pressure filtration is obtained if the solids content of the concentrated suspension is set to 10% to 30%, preferably 17% to 20%.

Preferably the method according to the invention is operated discontinuously, in which first of all a batch of liquid to be cleaned is exposed to an electric field and agglomerated, optionally a fraction of cleaned liquid is withdrawn, thereafter the electric field is disconnected and the particles of adsorbent are suspended in the (remaining) liquid, after which the concentrated suspension is filtered.

If the concentrated:suspension is likewise collected and only after this is fed to the pressure filtration stage, the pressure filtration can also be carried out economically, it being possible, in particular on the attainment of a particular filter cake loading, for the pressure filtration to be interrupted at any time in order to remove the filter cake.

If the agglomeration is carried out in two or more individual units, wherein the units thus load the pressure filtration staggered in time, the total process can take place continuously despite the batch-wise agglomeration.

In a further development it is preferred, particularly in order to improve existing process operations, that a part flow of the liquid containing solids particles be subjected to the agglomeration and the subsequent renewed suspension, wherein the concentrated suspension is fed to the unprocessed other part flow of the liquid and filtered together with it. The enlarged particle structures contained in the concentrated suspension increase in the following pressure filtration the permeability of the growing filter cake. A more economical cleaning can therefore also be achieved by means of a part treatment.

The problem is solved according to the apparatus by the fact that at least one agglomerator, with an inlet, an outlet each for the separated components (clear runnings, concentrated suspension) and an apparatus for producing the agglomeration, in particular an electric field, as well as a pressure filter with a feed inlet for the concentrated suspension and an outlet each for the separated components (clear runnings, filter cake), are provided.

The liquid to be cleaned is collected and agglomerated in the agglomerator with the apparatus for producing an electric field, for example at an electrode side. During the phase already cleaned liquid can be drawn off via the upper outlet. After disconnection of the electric field the agglomerated particles are suspended in the residual liquid once again and fed to the pressure filter as concentrated suspension via the second outlet. From there an outlet delivers the cleaned liquid. The filter cake can be extracted from the second outlet of the pressure filter as required.

It is preferred that a first collecting tank is provided downstream of the agglomerator in the inflow, in order to permit in the event of batch-wise operation of the agglomerator a liquid supply independent of the latter.

If a vacuum pump is connected to the first collecting tank, a low pressure of for example 40 to 120 mbar can be set in the collecting tank. For the further improvement of the adsorption of the fed bleaching earth it is also advantageous to heat the liquid in the tank to a temperature of 90° C. to 130° C.

If a second collecting tank is provided at the outlet of the agglomerator, whose outlet leads to the pressure filter via a pump, it is possible, in order to clean the pressure filter, for the supply of concentrated suspension to be interrupted for a short time without the operation of the agglomerator thereby being affected. The concentrated suspension is buffered in the second collecting tank.

Because at least two parallel connected agglomerators are provided, which are operated stepwise, the liquid to be cleaned can be supplied practically continuously, whereas the parallel connected agglomerators are operated stepwise or alternately. In this case the provision of a first collecting tank upstream of the agglomerators is not necessary.

BRIEF DESCRIPTION OF THE DRAWINGS

In an alternative embodiment of the invention it is possible that the agglomeration takes place instead of or in addition to the electric field by means of ultrasonics or by means of the addition of chemical or biochemical substances.

Three embodiments of the invention will be described below by means of the attached drawings, where.

DESCRIPTION OF THE INVENTION

Figure 1:
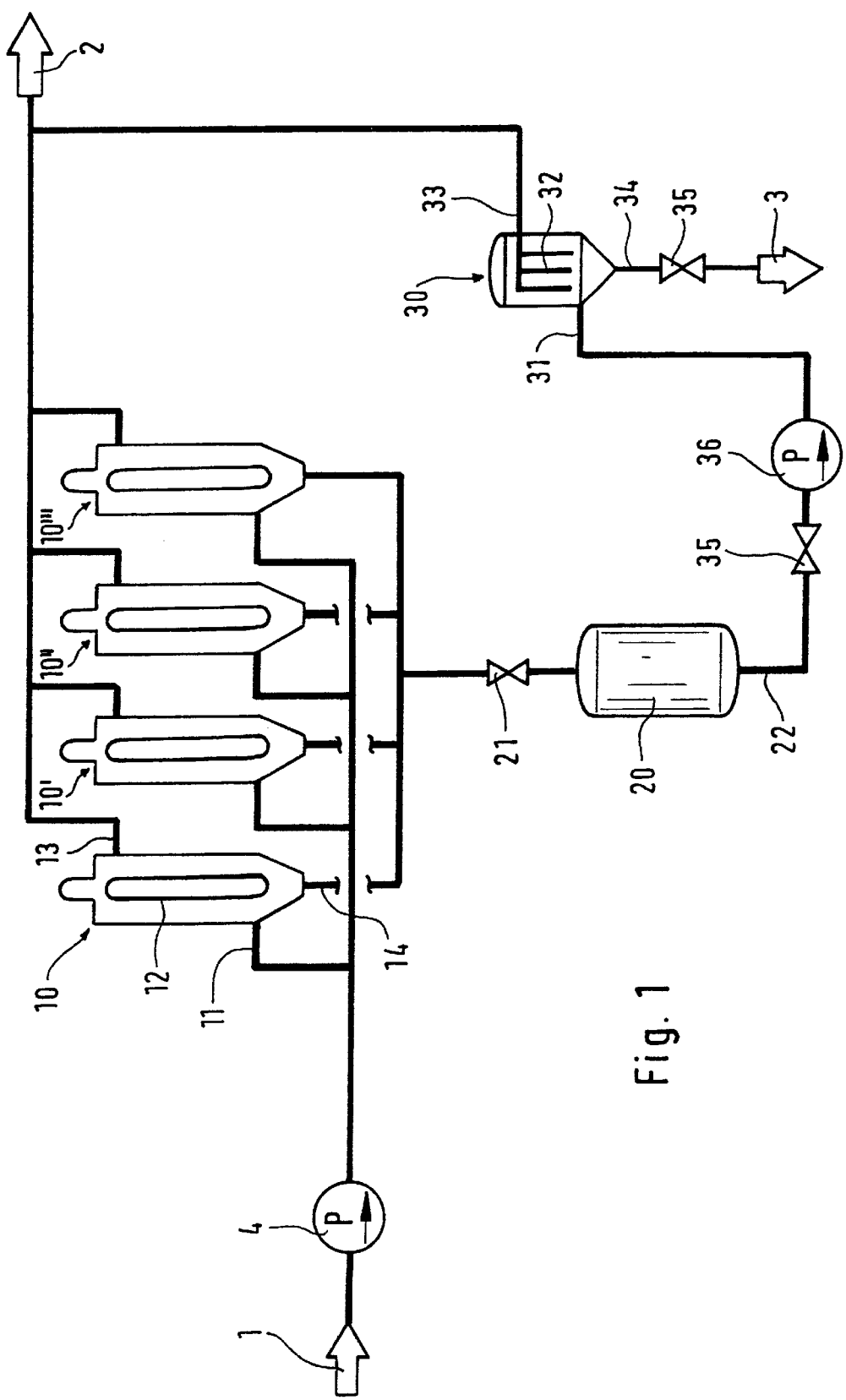
FIG. 1 shows an apparatus for cleaning liquids containing impurities by the method according to the invention, FIG. 2 another embodiment of such an apparatus and FIG. 3 a further embodiment of such an apparatus.

FIG. 1 shows diagrammatically the layout of an apparatus for cleaning liquids containing impurities in a first embodiment. A feed inlet for the suspension to be cleaned is shown by an arrow 1. The feed line leads via a feed pump 4 to four parallel connected agglomerators 10, 10', 10", 10'''. The agglomerators are of identical construction and are operated in turn. The agglomerator 10 has a feed opening 11 to which the feed 1 of the suspension to be cleaned is passed via the feed pump 4. Inside each agglomerator 10, 10', 10", 10''' is located an apparatus 12 for producing an electric field, which can be composed for example of two electrodes or electrode systems. On each of the agglomerators 10, 10', 10", 10''' is provided an outlet 13 for the part of the liquid which has already been cleaned in the agglomerator, namely the clear runnings. The outlet 13 is situated in the upper part of the agglomerator, in order to prevent impurities getting into the clear runnings. At the bottom end of each agglomerator is located an outlet 14 for the concentrated suspension. The outlet 14 of each agglomerator 10, 10', 10", 10''' is combined and connected to a second collecting tank 20 via a valve 21.

In the collecting tank 20 is therefore located the agglomerate or concentrate or alternatively the concentrated suspension.

From the second collecting tank 20 an outlet line 22 for the concentrated suspension leads to a feed inlet 31 of a pressure filter 30. In the connecting line are located a valve 35 and a sludge pump 36. The sludge pump 36 presses the concentrated suspension against the precoat filters 32 disposed in the pressure filter 30, in order to form a filter cake there. The liquid passing through the filter 32 is directed via an outlet 33 of the pressure filter 30 onto an outflow line designated by arrow 2, to which are also connected the outflows 13 of the agglomerators 10, 10', 10'', 10'''.

The filtrate therefore leaves the cleaning process via the outflow line designated by arrow 2.

At the bottom end of the pressure filter 30 is disposed an outlet 34 which leads via a valve 37 to an outflow 3 designated by arrow for the pasty mass (filter cake) to be discharged).

Figure 2:
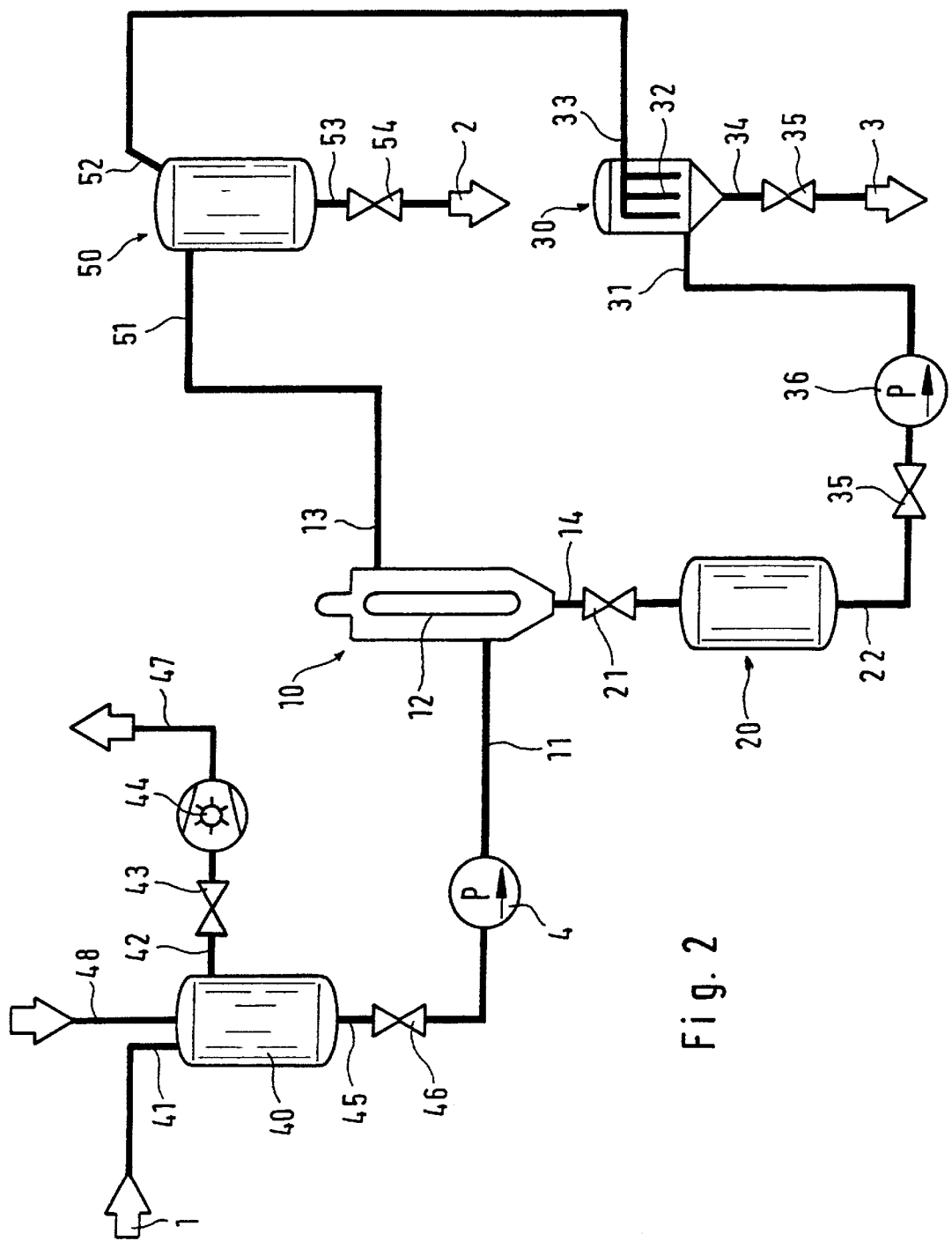

In the second embodiment as per FIG. 2 functionally identical components are marked with the same reference symbols corresponding to the embodiment according to FIG. 1. In FIG. 2 a bleaching stage 40 to 47 is added at the feed inlet 1. In the preliminary stage, adsorbents are fed to the liquid to be cleaned. The bleaching stage includes of a first collecting tank 40, which has a feed inlet 41 for the charging with the liquid to be cleaned and a further feed inlet 48 for the fresh adsorbents. There is further disposed on the collecting tank 40 a suction opening 42 with valve 43 and vacuum pump 44 for producing a reduced pressure in the tank. A line designated by the arrow 47 indicates the vacuum diagrammatically here. At the bottom end of the tank 40 is provided an outlet 45 with valve 46 for the removal of the liquid loaded with the adsorbents. The liquid is fed to a feed inlet 11 of an agglomerator 10 via the feed pump 41. In this embodiment only a single agglomerator 10 is provided, so that this apparatus has to be operated batchwise.

In the agglomerator 10 is disposed an electrode arrangement 12 for producing an electric field. The clear runnings of the agglomerator are fed via an outlet 13 disposed in the upper part of the tank to a feed inlet 51 of a third collecting tank 50. At the bottom end of the agglomerator 10 is provided an outlet 14 with a valve 21 for the concentrated suspension. A second collecting tank 20 is provided for collecting the concentrated suspension. An outlet 22 of the second collecting tank 20 leads via valve 35 and sludge pump 36 to a feed inlet 31 of a pressure filter 30.

The pressure filter 30 includes on the inside a precoat filter arrangement 32 which collects the suspended particles of the concentrated suspension. The pressure filter 30 includes an outlet 33 for the filtrate, which is connected to a feed inlet 52 of the third tank 50. The pressure filter 30 in addition includes at its bottommost end an outlet 34 with valve 35 for the removal of the filter cake as per arrow 3.

The third collecting tank 50 contains the cleaned liquid. At its bottom end is provided an outlet 53 with valve 54 for the delivery of the cleaned liquid as per arrow 2.

The cleaning method will be described below with reference to the embodiments shown.

In the operating sequence according to the embodiment shown in FIG. 1 the liquid loaded with impurities is fed substantially continuously via the feed pump 4 to at least one agglomerator 10, 10', 10'', 10'''. The agglomerators are filled batch-wise in succession in a stepwise operation. After the filling of the first agglomerator 10 the second agglomerator 10' is then filled with the suspension to be cleaned, while in the first agglomerator 10 the liquid is exposed to an electric field by means of the electrodes 12. In the phase the solids particles are collected on one electrode side and agglomerated. Cleaned liquid then accumulates on the other side, which is fed to the clear runnings via outlet 13. In the phase the third agglomerator 10'' is already filled with the suspension to be cleaned, while in the second agglomerator 10' the liquid is already exposed to an electric field. After disconnection of the electric field in the first agglomerator 10 the solids particles which have collected on the electrode are suspended in the remaining liquid. A concentrated suspension is therefore obtained. While the fourth agglomerator 10''' is now already being filled with suspension to be cleaned, the concentrated suspension is drawn off out of the first agglomerator 10 via outlet 14. The first agglomerator 10 is then ready to accept the next batch of liquid to be cleaned.

The concentrated suspension is stored temporarily in a second collecting tank 20 and fed to the pressure filter 30 by means of valve 35 and sludge pump 36 as required. The valve 35 is opened and the pump 36 is operated until the filter cake formed on the precoat filters 32 disposed in the pressure filter 30 has reached a maximum thickness.

Since the particles agglomerated in the agglomerators 10, 10', 10'', 10''' and suspended once again have an enlarged structure, a sufficient permeability of the filter cake for the liquid to be filtered is maintained for a long time. The filtrate obtained during the pressure filtration is produced as cleaned liquid together with the clear runnings of the agglomerators 10, 10', 10'', 10'''.

From to time the pressure filtration is interrupted, the valve 35 closed and the filter cake which has formed on the precoat filters discharged as a pasty mass via outlet 34 and valve 37.

The operating sequence according to the embodiment as per FIG. 2 is basically similar, with only one agglomerator 10 being provided, so that the plant has to be operated batch-wise. In addition it is shown in FIG. 2 that there are fed to the liquid to be cleaned via the feed inlet 48 adsorbents which are heated and held at reduced pressure in a first storage tank 40. In the tank the adsorbents fed adsorb the impurities contained in the liquid. The liquid loaded with the adsorbents is then fed to the cleaning outflow already described.

It is important here in particular that the particles contained in the liquid, in particular the adsorbents, have if possible a small particle size in the adsorption stage, in order to permit an optimum adsorption effect with low consumption of adsorbents. The particles and adsorbents are then agglomerated in the agglomerator and after disconnection of the electric field suspended once again, in the course of which structured particles, i.e. particles with enlarged particle size and a porous, loose structure, are obtained. The structured suspension thereby obtained is because of the enlarged particle size optimally pre-structured for a pressure filtration.

If a plant as per FIG. 2 is used for the bleaching of vegetable oils, for example a batch of 200 l of deslimed and deacidified or only deslimed, but in any case dried rape oil can be placed in the first collecting tank 40. The bleaching is carried out there with a temperature of 90° C. to 130° C., a pressure of 40 to 120 hPa or mbar and an addition of 0.2% to 1.5% of activated bleaching earth of any granulation.

After disconnection of the vacuum the bleached oil is pumped as a suspension into the agglomerator 10, which includes a separation area of 0.4 m$^2$ as electrode. During the filling of the agglomerator a voltage of 20 kV is applied to the electrodes. Thereafter the voltage is raised to 30 to 40 kV. The bleaching earth contained in the suspension and loaded with the impurities then moves to the positive electrode, the separation area, and in so doing agglomerates.

The clear oil exiting above the positive electrode at the outlet 13 is collected in the third collecting tank 50. After a certain time, approx. 15 min, the capacity of the separation area is exhausted and the feed pump is shut down. After disconnection of the electric field the bleaching earth particles agglomerated on the positive electrode are suspended once again in the oil. The contents of the agglomerator are then passed into the sludge tank 20. The oil and the agglomerated bleaching earth produces a suspension with 10% to 30% bleaching earth for the subsequent pressure filtration. This described procedure is then repeated until approx. 100 l of concentrated suspension (sludge) are obtained.

The concentrated suspension is then passed by means of the sludge pump 36 through a modified precoat filter with 0.2 m² filter area. The filtration is operated up to a loading of 85 kg per m² of filter area. The residue of clear oil is likewise collected in the collecting tank 50, while the filter cake is discharged downwards as a pasty mass. Conventional drying by blowing out with compressed air or vapour to a residual oil content of 20 to 30% is possible thereafter.

Figure 3:
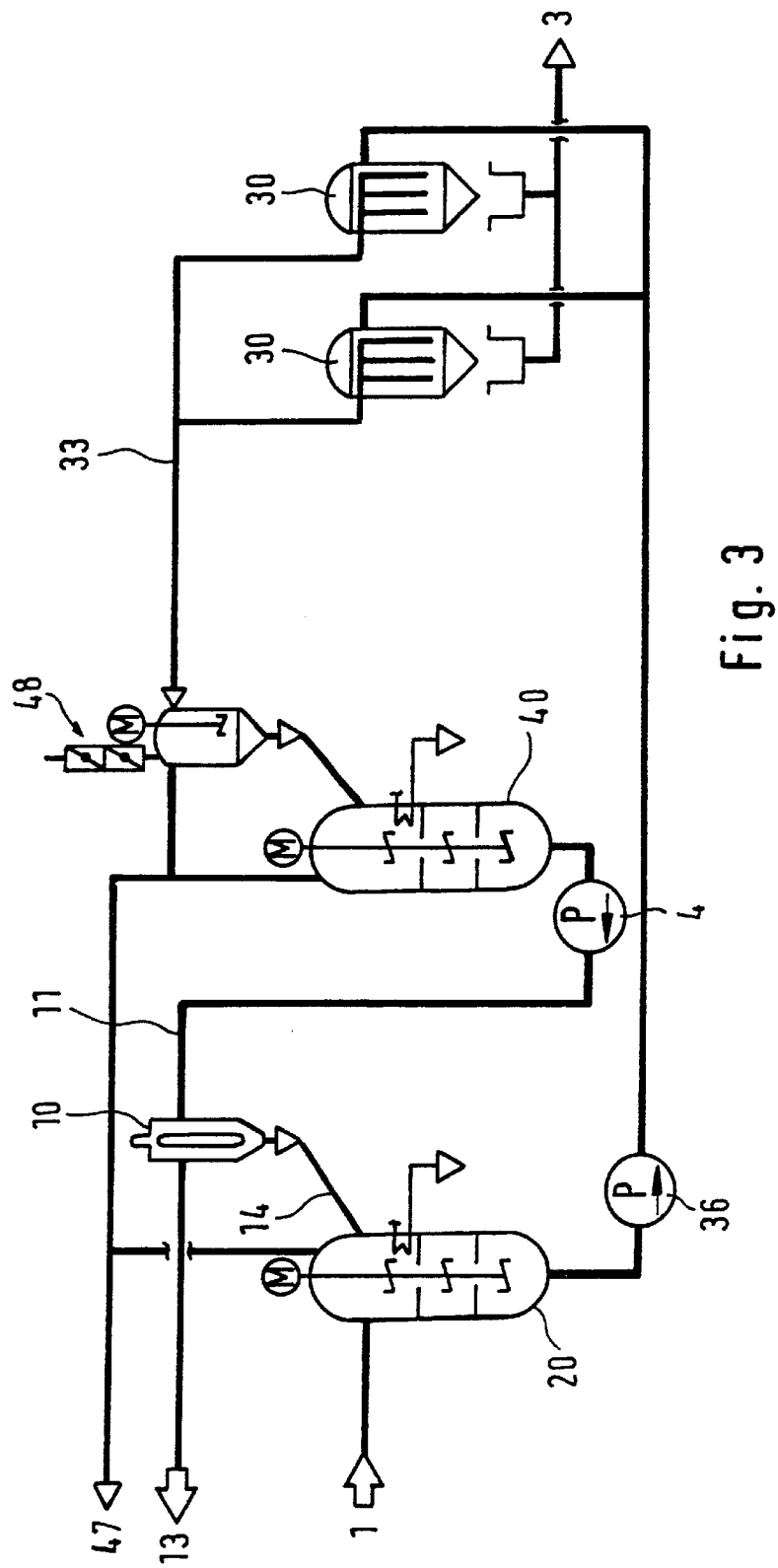

The method of operation according to the invention thus permits the use of adsorbents structured in any way, for example bleaching earth with maximum fine grain content. This leads to considerable economic advantages, since cheaper bleaching earth can be used due to absence of the previous pre-structuring, and overall to a reduced proportioning, since an excess amount of bleaching earth no longer has to be added. Furthermore, the previous complex and maintenance-intensive filtration units, which in addition have always had to be employed in pairs, are now replaced by a compact maintenance-free pre-treatment stage (agglomerator) with a subsequent pressure filtration stage of reduced size, whose filter area can be reduced by 80% because of the porous structure of the filter cake. The embodiment from FIG. 3 represents a countercurrent bleaching process in accordance with German patent application 196 20 695.2-41 published at a later date. The reference symbols are here attached to functionally similar elements as in the other two embodiments discussed above. The order is however slightly different in some cases.

At the feed inlet 1 the suspension to be cleaned is fed into a tank 20. There is fed to the tank 20 via a line 14 the outflow containing the sludge from another stage, namely the agglomerator 10, which is described in detail below. From the collecting tank 20 the accruing total amount or mixture of partly cleaned suspension is fed together with the sludge and the strongly contaminated bleaching earth portion contained therein to two pressure filters 30. The strongly contaminated bleaching earth portions together with sludge and other undesirable solids portions are now filtered out in the pressure filters 30 and removed from the process via the outflow 3. The outlet 33 from the pressure filter 30 passes the residue, i.e. the now partly cleaned suspension, to a further tank in which it is supplemented with fresh bleaching earth from a feed inlet 48 and fed to the first collecting tank 40, which here contains a mixer. The mixer 40 mixes the liquid or suspension already substantially cleaned and now containing only relatively few impurities with the bleaching earth still possessing considerable cleaning power, namely fresh bleaching earth. The mixture is then fed via the pump 4 to the agglomerator 10 which has already been mentioned above. The agglomerator 10 then operates in a similar way to that described in the first embodiments, so that reference is made to the latter here. The clear runnings here again run out of the process via the outlet 13, the now partly contaminated and used bleaching earth is fed into the second collecting tank 20 again as sludge via the outlet 14, as has already been mentioned for the embodiment.

The agglomerator 10 can in addition operate here in the manner described in German patent application 196 20 695.2-41. Explicit reference is therefore made to the contents.

The collecting tanks 20 and 40 as well as the intermediate tank are again connected to vacuum via a line 47.

List of Reference Symbols

1 feed inlet (arrow)
2 outflow (arrow)
3 outflow (arrow)
4 feed pump
10 agglomerator
10' agglomerator
10" agglomerator
1''' agglomerator
11 feed inlet
12 electrode apparatus
13 outlet (clear runnings)
14 outlet (sludge)
20 second collecting tank
21 valve
22 outlet
30 pressure filter
31 feed inlet
32 precoat filter
33 outlet
34 outlet
35 valve
36 pump
40 first collecting tank
41 feed inlet
42 suction opening
43 valve
44 vacuum pump
45 outlet
46 valve
47 line (arrow)
48 feed inlet
50 third collecting tank
51 feed inlet
52 feed inlet
53 outlet
54 valve

What is claimed is:

1. A method for cleaning liquids containing impurities, comprising the steps of:
    adding a plurality of adsorbent particles to the liquid to adsorb the impurities contained in the liquid,
    providing an electric field in proximity to the liquid in order to form a plurality of agglomerates of adsorbent particles from the adsorbent particles in the liquid, after the step of adding the adsorbent particles,
    suspending the agglomerates in the liquid after the step of forming the plurality of agglomerates, and
    filtering the liquid containing the suspended agglomerates under the influence of pressure after the step of suspending the agglomerates.

2. The method of claim 1, wherein the liquid containing the agglomerates is recycled to a first counter-current stage before the liquid is filtered.

3. The method of claim 1, wherein the agglomerates are formed on at least one electrode by subjecting the particles of adsorbent to an electric field.

4. The method of claim 3, further comprising forming the agglomerates by subjecting the particles of adsorbent to a discontinuous electric field,
  disconnecting the electric field,
  suspending the solids particles in the remaining liquid, and
  filtering the liquid containing the suspended agglomerates.

5. The method of claim 4, further comprising the step of continuously cleaning the liquid containing impurities.

6. The method of claim 4, further comprising drawing off at least a portion of the filtrate.

7. The method of claim 3, further comprising removing the agglomerates from the at least one electrode by varying the electric field.

8. The method of claim 7, wherein varying the electric field includes disconnecting the electric field.

9. The method of claim 1, further comprising removing a substantially solids particle-free fraction of the liquid during the agglomeration.

10. The method of claim 1, wherein the liquid containing impurities is selected from the group consisting of animal oils, animal fats, vegetable oils, vegetable fats, marine oils, marine fats, mineral oils, mineral fats, and combinations thereof.

11. The method of claim 1, wherein the adsorbents have a diameter of about 5 um to about 10 um.

12. The method of claim 11, wherein the adsorbent is selected from the group consisting of bleaching earth, silica gel, activated carbon, and combinations thereof.

13. The method of claim 12, wherein the adsorbent is bleaching earth.

14. The method of claim 1, wherein the concentration of solids in the liquid containing the suspended agglomerates is about 10% to about 30%.

15. The method of claim 1, further comprising forming a first portion of liquid containing agglomerates.
  combining the first portion with a second portion of unprocessed liquid to form a combined stream, and
  filtering the combined stream.

16. A method for cleaning liquids containing impurities, comprising the steps of:
  adding a plurality of adsorbent particles to the liquid to adsorb the impurities contained in the liquid;
  forming a plurality of agglomerates of adsorbent particles after the step of adding the adsorbent particles,
  suspending the agglomerates in the liquid after the step of forming the plurality of agglomerates; and
  filtering the liquid containing the suspended agglomerates after the step of suspending the agglomerates.

17. The method of claim 16, wherein the agglomerates are formed by one of the group consisting of ultrasonic, adding a chemical substance, adding a biochemical substance and combinations thereof.

18. The method of claim 16, wherein the liquid containing the agglomerates is recycled to a first counter-current stage before the liquid is filtered.

19. The method of claim 16, further comprising removing a substantially solids particle-free fraction of the liquid during the agglomeration.

20. The method of claim 16, wherein the liquid containing impurities is selected from the group consisting of animal oils, animal fats, vegetable oils, vegetable fats, marine oils, marine fats, mineral oils, mineral fats, and combinations thereof.

21. The method of claim 16, wherein the adsorbents have a diameter of about 5 um to about 10 um.

22. The method of claim 21, wherein the adsorbent is selected from the group consisting of bleaching earth, silica gel, activated carbon, and combinations thereof.

23. The method of claim 22, wherein the adsorbent is bleaching earth.

24. The method of claim 16, wherein the concentration of solids in the liquid containing the suspended agglomerates is about 10% to about 30%.

25. The method of claim 16, further comprising the step of continuously cleaning the liquid containing impurities.

26. The method of claim 16, further comprising:
  forming a first portion of liquid containing agglomerates,
  combining the first portion with a second portion of unprocessed liquid to form a combined stream, and
  filtering the combined stream.

27. A method for cleaning liquids containing impurities, comprising the steps of:
  adding a plurality of adsorbent particles to the liquid to adsorb the impurities contained in the liquid;
  providing an electric field in proximity to the liquid in order to form a plurality of agglomerates of adsorbent particles from the adsorbent particles in the liquid;
  suspending the agglomerates in the liquid by removing the liquid from the presence of the electric field; and
  filtering the liquid containing the suspended agglomerates under the influence of pressure.

28. The method of claim 27, further comprising drawing off at least a portion of the filtrate.

29. The method of claim 27, wherein the liquid containing the agglomerates is recycled to a first counter-current stage before the liquid is filtered.

30. The method of claim 27, wherein the agglomerates are formed on at least one electrode by subjecting the particles of adsorbent to an electric field.

31. The method of claim 30, further comprising forming the agglomerates by subjecting the particles of adsorbent to a discontinuous electric field,
  disconnecting the electric field,
  suspending the solids particles in the remaining liquid, and
  filtering the liquid containing the suspended agglomerates.

32. The method of claim 31, further comprising the step of continuously cleaning the liquid containing impurities.

33. The method of claim 31, further comprising drawing off at least a portion of the filtrate.

34. The method of claim 30, further comprising removing the agglomerates from the at least one electrode by varying the electric field.

35. The method of claim 34, wherein varying the electric field includes disconnecting the electric field.

36. The method of claim 27, further comprising removing a substantially solids particle-free fraction of the liquid during the agglomeration.

37. The method of claim 27, wherein the liquid containing impurities is selected from the group consisting of animal oils, animal fats, vegetable oils, vegetable fats, marine oils, marine fats, mineral oils, mineral fats, and combinations thereof.

38. The method of claim 27, wherein the adsorbents have a diameter of about 5 um to about 10 um.

39. The method of claim 38, wherein the adsorbent is selected from the group consisting of bleaching earth, silica gel, activated carbon, and combinations thereof.

40. The method of claim 39, wherein the adsorbent is bleaching earth.

41. The method of claim 27, wherein the concentration of solids in the liquid containing the suspended agglomerates is about 10% to about 30%.

42. The method of claim 27, further comprising the step of:

forming a first portion of liquid containing agglomerates, combining the first portion with a second portion of unprocessed liquid to form a combined stream, and filtering the combined stream.

* * * * *